United States Patent [19]

Anic et al.

[11] Patent Number: 5,352,284
[45] Date of Patent: Oct. 4, 1994

[54] STARCH BASED ADHESIVE

[75] Inventors: Jure Anic, Krefeld; Christian Meyer-Wegner, Kempen, both of Fed. Rep. of Germany

[73] Assignee: Cerestar Holding B. V., Netherlands

[21] Appl. No.: 173,880

[22] Filed: Dec. 27, 1993

Related U.S. Application Data

[63] Continuation of Ser. No. 730,439, Jul. 16, 1991, abandoned.

[30] Foreign Application Priority Data

Jul. 16, 1990 [GB] United Kingdom ............... 9015568.0

[51] Int. Cl.$^5$ ............................................. C09D 101/26
[52] U.S. Cl. .................................. 106/189; 106/197.1; 106/213
[58] Field of Search ...................... 106/197.1, 213, 189

[56] References Cited

U.S. PATENT DOCUMENTS

| 2,102,937 | 12/1937 | Bauer | 106/197.1 |
| 2,917,396 | 12/1959 | Agulnick | 106/197.1 |
| 4,424,291 | 1/1984 | Leake et al. | 156/328 |
| 4,614,545 | 9/1986 | Hess | 106/197.1 |

*Primary Examiner*—David Brunsman
*Attorney, Agent, or Firm*—Cushman, Darby & Cushman

[57] ABSTRACT

A starch adhesive composition which comprises; a gelatinized carrier starch, an ungelatinized starch, an alkali and eater in which the ungelatinized starch comprises a cross linked starch and the composition also contains a hydroxypropyl methyl cellulose ether.

12 Claims, No Drawings

STARCH BASED ADHESIVE

This is a continuation of application Ser. No. 07/730,439, filed on Jul. 16, 1991, which was abandoned upon the filing hereof.

The present invention relates to the production of starch-based adhesives and in particular to the production of starch-based adhesives which do not contain boric acid, borax or other boron compound.

Starch-based adhesives are widely used as paper and cardboard adhesives particularly in the corrugating industry in which corrugated board is made in a continuous process. In this process a sheet of paper is first corrugated on heated rolls and a sheet of liner paper is then attached by a starch adhesive to the tips of the corrugations on one side. This is a "single-facer" corrugated board while a "double backer" board has liner papers attached to both sides of the corrugated paper.

It is essential in the production of corrugated board that the starch adhesive should be able to form rapidly a bond between the paper surfaces under conditions in which relatively high (single-facer) and relatively low (double-backer) pressure may be applied and in which there is a good and extensive contact (single-facer) and possibly a restricted contact (double-backer) between the surfaces to be bonded. It is important therefore that the viscosity of the starch adhesive should be such as to permit ease of application to a moving surface yet should be capable of a rapid increase caused by gelatinisation of the starch.

The rapid gelatinisation of the starch is promoted by the temperature of application and by including sodium hydroxide and a boron compound such as boric acid or borax in the adhesive composition. Since 1937 the so-called "Stein-Hall" starch adhesives have been widely used (see U.S. Pat. No. 2,102,937) in which the starch is present in both gelatinised and ungelatinised form. The gelatinised starch acts as the "carrier" and is an effective dispersing agent for the ungelatinised starch. The ungelatinised starch is caused to gelatinise on the paper surface resulting in the desired rapid increase in viscosity. Variants of this composition are the "no-carrier" starch adhesives in which all the starch is ungelatinised but is partially swollen and adhesives in which a large part of the starch (40 to 60%) is partly swollen and the remainder is unswollen and ungelatinised. A typical Stein-Hall corrugating adhesive contains water (81.26%), ungelatinised starch (14.81%), gelatinised starch (2.96%), sodium hydroxide (0.56%) and borax pentahydrate (0.41%).

The presence of boron in the adhesive has recently been subject to criticism. When a boron-containing starch adhesive is used on a corrugating unit boron inevitably passes into the waste water by plant washings. Since boron is toxic to certain crops the wastewater treatment authorities are placing stringent requirements for a low level of boron in waste water. In addition, for applications in which a paper or paper product glued with a starch adhesive comes into contact with food there is the problem of boron passing from the adhesive into the food. Moreover, the recycling of corrugated board which has been made with a boron-containing adhesive gives rise to the production of paper with a persistent boron content. For these reasons there is a growing demand for a starch based adhesive which is free from significant amounts of boron but which retains the advantages, conferred by borax or boric acid, of viscosity and body in the adhesive and tack in the green adhesive bond.

One approach to a boron-free starch adhesive is to omit the boron and to modify the composition to produce a product with the same properties as an adhesive containing a boron compound. This can be achieved by increasing the solids content of the adhesive as is described in the Tappi Journal for May 1989, pages 135 to 138. We have found however that a starch adhesive with increased solids has a less stable viscosity and a lower increase in viscosity at the glueing point.

We have now devised a starch adhesive formulation which is free from significant amounts of boron but which has good viscosity stability, good pot life, good increase in viscosity at the glueing point and a good water resistance of the applied glue.

Accordingly, the invention is a starch based adhesive composition comprising a gelatinised carrier starch, an ungelatinised starch, an alkali and water which is characterised in that the ungelatinised starch comprises a cross-linked starch and that the composition also contains a hydroxypropyl methyl cellulose ether.

Cross-linked starches are well known products and are widely used for their thickening properties. The cross-linking is achieved by reacting starch with a bifunctional reagent capable of reacting with starch hydroxyl groups. Typical bifunctional reagents which may be used are dihydroxy-compounds, dihaloalkanes or dihaloalkenes, diepoxides, epihalohydrins e.g. epichlorohydrin, dibasic acids e.g. adipic acid, and polybasic acids e.g. phosphoric acid. Preferred cross-linked starches for use in compositions according to the present invention are those cross-linked by epichlorohydrin or by a mixture of adipic acid and acetic anhydride (acetylated di-starch adipate). Particularly preferred however is a cross-linked starch which has been cross-linked by N,N'-dimethylol-N,N'-ethylene urea. The cross-linked starch may be derived from any of commercially available starches although cross-linked maize and potato starches are preferred. If desired, the cross-linked starch may also be substituted by one or more mono-functional substituents e.g. by acetate or hyroxypropyl groups, or some of the functional groups of the cross-linked starch may be modified e.g. by oxidation.

The cross-linked starch is ungelatinised but may be partially swollen. The carrier portion of the composition is however fully gelatinised starch which again may be any commercially available starch although maize starch is preferred. The total starch content of the composition suitably lies in the range 15 to 45% by weight of the adhesive preferably 20 to 35% by weight especially 25 to 30% by weight. The cross-linked starch preferably comprises at least 80% by weight of the total starch more preferably 85% to 95% by weight of the total starch.

The alkali used in the composition is preferably sodium hydroxide in an amount suitably in the range 0.1 to 1% by weight, preferably 0.2 to 0.6% by weight of the adhesive composition. If desired, the sodium hydroxide may be formed in situ by providing for the presence of sodium carbonate and calcium hydroxide.

The hydroxypropyl methyl cellulose ether component of the composition may have varying methoxyl and hydroxypropoxyl substitution. Typically, commercially available hydroxypropyl methyl cellulose ethers are those with (a) 27 to 30 weight % methoxyl and 4 to 7.5 weight % hydroxypropoxyl;
(b) 28 to 30 weight % methoxyl and 7 to 12 weight % hydroxypropoxyl;
(c) 19 to 24 weight % methoxyl and 4 to 12 weight % hydroxypropoxyl;
(d) 16.5 to 20 weight % methoxyl and 23 to 32 weight % hydroxypropoxyl;
(e) 20 to 32 weight % methoxyl and 2 to 10 weight % hydroxypropoxyl;
(f) 19 to 28 weight % methoxyl and 7.5 to 11.5 weight % hydroxypropoxyl.

Preferably the hydroxypropyl methyl cellulose ether is chosen from the group represented by (a) above. The amount of the hydroxypropyl methyl cellulose ether present in the composition according to the invention suitably lies in the range 0.05 to 0.5% by weight of the composition, preferably 0.1 to 0.25%.

The starch adhesive compositions according to the present invention may also contain other minor components which are found in conventional starch adhesives, for example urea formaldehyde water proofing additives which are allowed for food use. Such optional components will only be present in small amounts and the balance and bulk of the composition, when ready for use, will be made up by water. It is however possible for a composition to be made up in powder form by the starch supplier which contains all of the ingredients of the adhesive composition except for the water, and for the adhesive user to add water on site. The conditions for the preparation and use of the starch adhesive compositions according to the present invention are those known for conventional starch adhesives which contain borax or boric acid so no change in the user's corrugating plant is required.

The invention will now be further illustrated by reference to the following Examples.

In the Examples the starch adhesive compositions were made up, unless otherwise described, by heating the carrier starch at 60° C. with sodium hydroxide and part of the water. The gelatinised carrier was then added to the remainder of the water and granular starch (comparative Example), or cross-linked starch (Example of the invention) and was followed by the addition of borax (comparative Example), or hydroxypropyl methyl cellulose ether (Example of the invention). The critical properties used to evaluate a corrugating adhesive were then measured, firstly after preparation and secondly after standing overnight. The results were as follows:

|  | Comparative | Example |  |  |  |  |  |  |  |  |
|---|---|---|---|---|---|---|---|---|---|---|
|  |  | 1 | 2 | 3 | 4 | 5 | 6 | 7 | 8 | 9 |
| Water % |  | 75 | 75 | 75 | 75 | 75 | 75 | 75 | 70 | 70 |
| Cross-linked maize starch %*++ | — | 90 | 90 | — | 90 | 90 | — | — | 90 | 90 |
| Cross-linked potato starch %*++ | — | — | — | 90 | — | — | 90 | 90 | — | — |
| Granular maize starch %* | 100 | — | — | — | — | — | — | — | — | — |
| Carrier starch%* | — | 10 | 10 | 10 | 10 | 10 | 10 | 10 | 10 | 10 |
| Cellulose ether %+ | — | 0.15 | 0.15 | 0.15 | 0.15 | 0.15 | 0.15 | 0.15 | 0.15 | 0.15 |
| Water resistant resin %* |  | — | — | — | — | 10 | — | 10 | — | 10 |
| Total solids % | 25 | 25 | 25 | 25 | 25 | 25 | 25 | 25 | 30 | 30 |
| Sodium hydroxide % | 0.55 | 0.22 | 0.44 | 0.44 | 0.54 | 0.54 | 0.44 | 0.44 | 0.54 | 0.54 |
| Borax % | 0.42 | — | — | — | — | — | — | — | — | — |
| Measurement after Preparation |  |  |  |  |  |  |  |  |  |  |
| Stein-Hall viscosity secs | 45 | 45 | 63 | 134 | 54 | 51 | 52 | 46 | 62 | 76 |
| Gel-point °C. | 61.7 | 67.7 | 62.0 | 57.2 | 60.1 | 61.9 | 57.3 | 59.1 | 59.8 | 61.2 |
| Gel-Viscosity Peak mm | 75 | 22.5 | 50 | 37.5 | 51 | — | 52.5 | — | 58 | — |
| Measurement after overnight standing |  |  |  |  |  |  |  |  |  |  |
| Stein-Hall viscosity secs | 44 | 47 | 51 | 110 | 44 | 33 | 52 | 34 | 59 | 40 |
| Gel-point °C. | 62.5 | — | 62.2 | 57.7 | 60.5 | 64 | 58.2 | 61.2 | 60.3 | 63.9 |
| Brookfield viscosity mPas | — | — | — | — | — | 788 | — | 678 | — | 1960 |

*% by weight based on total starch. All other percentages are by weight of the total composition.
+The cellulose ether was METHOCEL 228 (METHOCEL is a trademark) a hydroxypropyl methyl cellulose ether having 27 to 30% methoxyl and 4.0 to 7.5% hydroxypropoxyl and sold by Dow Chemical Europe S.A.
++The crosslinking agent was N,N'-dimethylol-N,N'-ethylene urea.

COMPARATIVE EXAMPLES

Adhesives formulations were made up in accordance with the procedure described in Tappi Journal for May 1989 pages 135 to 138. The exact compositions and the results obtained on testing them are given in the following Table

|  | Example No |  |  |
|---|---|---|---|
|  | A (L1) | B (L2) | C (L3) |
| Primary Mixer (Carrier) |  |  |  |
| water g. | 120 | 135.9 | 136.7 |
| granular maize starch | 43.3 | 49 | 49.3 |
| sodium hydroxide (50%) | 9.23 | 10.46 | 5.91 |
| Heat to 54° C. and agitate for 15 mins. |  |  |  |
| Add water | 54.5 | 61.75 | 62.1 |
| Secondary Mixer |  |  |  |
| water g. | 356.7 | 404 | 406.3 |
| granular maize starch | 216.3 | 138.9 | 139.7 |
| Total batch g. | 800 | 800 | 800 |
| Total solids % | 33 | 24.14 | 24.0 |
| Sodium Hydroxide concentration % | 0.58 | 0.65 | 0.37 |
| Carrier % | 16.7 | 26.1 | 26.1 |
| Measurements after preparation |  |  |  |
| Stein-Hall viscosity secs | Not measurable | 280 | Lumpy not measurable |
| Brookfield viscosity mPas | 2200 | 1400 | 1510 |
| Gel point | 57.2 | 56.0 | 57.8 |
| Gel viscosity peak mm | 43 | 16 | 16 |
| Measurement after overnight stirring |  |  |  |
| Brookfield viscosity | 3040 | 2480 | 1980 |

The larger amount of carrier component in these adhesive compositions and the consequent higher solids give an increased adhesive viscosity with associated retrogradation of the carrier and a reduced viscosity development at the point of gelatinisation which is very important for initial adhesion.

In practice the effect is a drastic reduction in corrugating production speed and a rapid consumption of the adhesive. In spite of intensive shear by stirring the high viscosity could not be reduced.

We claim:

1. A starch adhesive composition which comprises a gelatinised carrier starch, an ungelatinised starch, an alkali and water in which the ungelatinised starch comprises a cross-linked starch and the composition also contains a hydroxypropyl methyl cellulose ether.

2. A starch adhesive composition according to claim 1 in which the cross-linked starch is cross-linked by a dihydroxy-compound, a dihaloalkane, a dihaloalkene, a diepoxide, an epihalohydrin or a polybasic acid.

3. A starch adhesive composition according to claim 2 in which the cross-linked starch is cross-linked by epichlorohydrin, N,N'-dimethylol-N,N'-ethylene urea or by a mixture of adipic acid and acetic anhydride.

4. A starch adhesive composition according to claim 1 in which the cross-linked starch is maize starch or potato starch.

5. A starch adhesive composition according to claim 1 which comprises 15 to 45% by weight total starch.

6. A starch adhesive composition according to claim 1 in which the cross-linked starch comprises at least 80% by weight of the total starch present in the composition.

7. A starch adhesive composition according to claim 6 in which the cross-linked starch comprises 85 to 95% by weight of the total starch present in the composition.

8. A starch adhesive composition according to claim 1 in which the hydroxypropyl methyl cellulose ether is selected from the group consisting of hydroxypropyl methyl cellulose ethers comprising:
   (a) 27 to 30 weight % methoxyl and 4 to 7.5 weight % hydroxypropoxyl groups;
   (b) 28 to 30 weight % methoxyl and 7 to 12 weight % hydroxypropoxyl groups;
   (c) 19 to 24 weight % methoxyl and 4 to 12 weight % hydroxypropoxyl groups;
   (d) 16.5 to 20 weight % methoxyl and 23 to 32 weight % hydroxypropoxyl groups;
   (e) 20 to 32 weight % methoxyl and 2 to 10 weight % hydroxypropoxyl groups; and
   (f) 19 to 28 weight % methoxyl and 7.5 to 11.5 weight % hydroxypropoxyl groups.

9. A starch adhesive composition according to claim 8 in which the hydroxypropyl methyl cellulose ether comprises 27 to 30 weight % methoxyl and 4 to 7.5% weight % hydroxypropoxyl groups.

10. A starch adhesive composition according to claim 1 which contains 0.05 to 0.5% by weight of the composition of the hydroxypropyl methyl cellulose ether.

11. A precursor for making a starch adhesive composition which comprises; a gelatinized carrier starch, an ungelatinized starch, an alkali and eater in which the ungelatinized starch comprises a cross linked starch and the composition also contains a hydroxypropyl methyl cellulose ether; which comprises a pregelatinized starch, a cross-linked starch, an alkali and a hydroxypropyl methyl cellulose ether.

12. A starch adhesive composition which comprises a gelatinised carrier starch, an ungelatinised starch, an alkali and water in which the ungelatinised starch comprises cross-linked starch and the composition also contains a hydroxypropyl methyl cellulose ether and is free of boron.

* * * * *